July 30, 1968   F. H. SAWADA   3,395,294
HIGH SPEED AMPLIFIER-DISCRIMINATOR WITH WIDE DYNAMIC RANGE
Filed March 25, 1965   2 Sheets-Sheet 1

INVENTOR.
Fred H. Sawada
BY
ATTORNEY.

INVENTOR.
Fred H. Sawada
BY
ATTORNEY.

United States Patent Office 3,395,294
Patented July 30, 1968

3,395,294
HIGH SPEED AMPLIFIER-DISCRIMINATOR WITH WIDE DYNAMIC RANGE
Fred H. Sawada, Scotia, N.Y., assignor to the United States of America as represented by the United States Atomic Energy Commission
Filed Mar. 25, 1965, Ser. No. 442,837
3 Claims. (Cl. 307—235)

ABSTRACT OF THE DISCLOSURE

A high frequency pulse amplifier having a wide dynamic amplitude range. The output from a differentiator-clipper combination provides an input to the base of an emitter-follower having its base-emitter circuit normally heavily conducting at unity gain. A tunnel diode connected to the output of the pulse amplifier is biased to provide narrow pulses in response to input pulses which exceed a predetermined value.

---

This invention relates to a high speed amplifier-discriminator circuit and more particularly to one which is capable of detecting short duration random pulses which vary over a wide dynamic amplitude range at high frequency and transmitting these pulses at a constant amplitude.

In radiation detection and other electronic systems it frequently is desirable to count a large number of rapidly occurring pulses which differ greatly in amplitude. For example a scintillation crystal and photomultiplier may be used to measure radiation. Such radiation may include gamma rays which vary randomly from a few electron volts to several million electron volts. In such a case the amplitude of the output pulses from the photomultiplier also vary over a wide range. In order to count or record all of these pulses or at least those within a desired energy level, the pulses from the photomultiplier must be made to appear of the same amplitude.

The detection and counting of such gamma rays and the corresponding pulses from the photomultiplier is further complicated by the fact that such pulses have a very narrow width and may number several thousand per second. Thus, the circuitry must have a fast response and must have parameters which do not cause an overlap of successive pulses.

Accordingly, it is an object of this invention to provide an improved radiation detector circuitry.

It is another object to provide an improved pulse amplifier and discrminator circuitry.

In accordance with the present invention circuitry is provided for amplifying and counting output pulses from a photo or electron multiplier having a range of values between 20 millivolts and 3 volts in amplitude. These pulses from the multiplier are fed to a diode clipper and to an emitter-follower biased at unity gain for compressing the high amplitude signals. The output of the emitter-follower as so compressed is connected to a pulse amplifier. The pulse amplifier includes a number of cascaded stages in which alternate stages are biased near saturation and near cutoff so that maximum amplification is obtained in each stage. The stages are connected by differentiating circuits which are arranged so that the maximum amplification is obtained for the leading edge of the pulse. The pulse amplifier controls a tunnel diode having an adjustable threshold for providing a constant amplitude pulse to a counter or recorder for all of the amplifier output pulses which exceed this threshold.

The above and other objects will be clear to those skilled in the art upon reading the following detailed description of my invention in which.

Figure 1:
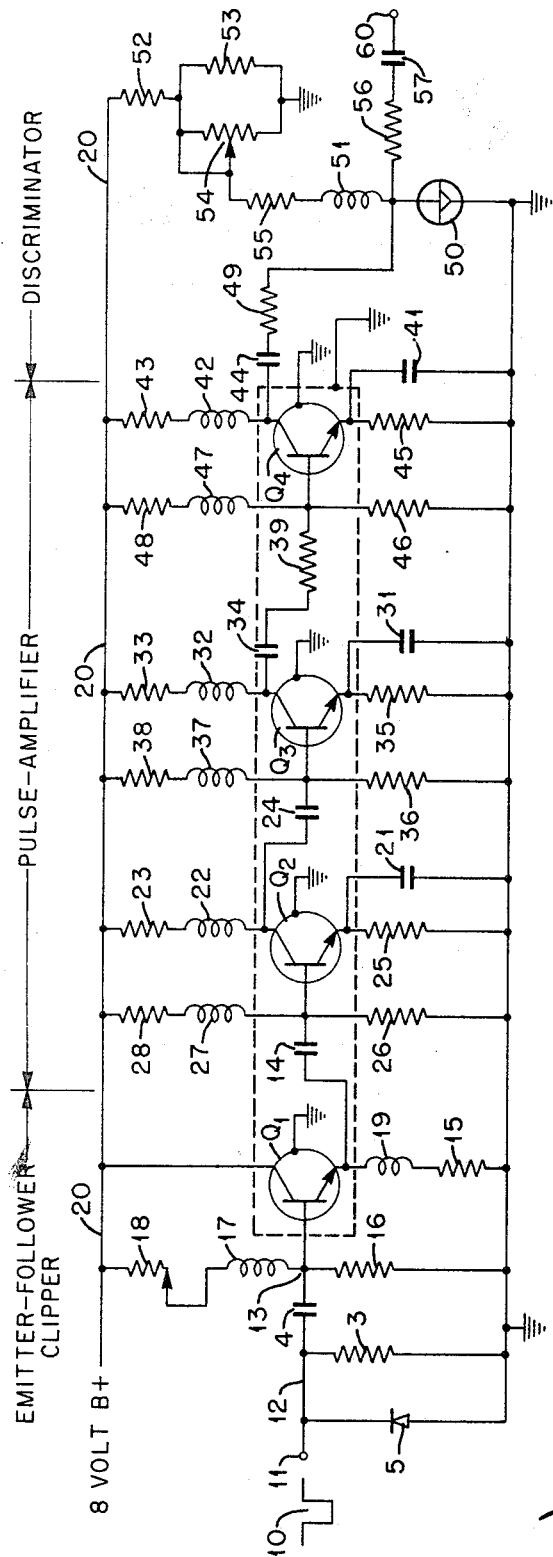
FIG. 1 is a schematic form of the invention.

In the detection of radiation, electrical pulses are generated with an amplitude dependent upon the energy of the radiation. The energy of gamma rays may vary over a considerable range. Accordingly, in detecting gamma radiation with a sodium iodide scintillation crystal and a photomultiplier, the electrical output pulses from multiplier may vary over a considerable amplitude. Negative output pulse 10 represents one output pulse from such a photomultiplier and this pulse may have an amplitude of from a few millivolts to several volts. The rate of such pulses may be several thousand per second.

These negative pulses are applied to input terminal 11 and applied to line 12 and across clipping diode 5. Diode 5 is an IN 3062 type and clips pulse 10 only when the amplitude is above 1.5 volts. Thus, input pulses from a few millivolts to 1.5 volts pass through condenser 4 to the base of emitter-follower $Q_1$. Condenser 4 and resistor 16 differentiate the input pulse to provide a negative and positive pulse corresponding to the leading and trailing end of the input pulse.

Emitter-follower $Q_1$ is biased at its base to provide unity voltage gain for input signal at the base of a few millivolts. For larger signals the gain of the stage decreases as shown subsequently. The bias network includes a 10K ohm resistor 16 in series with a .3 micro-henry choke 17 and a 33K ohm potentiometer 18 between ground and the eight volt positive source 20. Unity gain as specified above refers to an emitter-follower circuit where the base is heavily biased in the forward direction to allow the low level negative input signals to pass with a minimum attenuation. Large amplitude input pulses (negative) will decrease the base current of $Q_1$, thus resulting in a lower output voltage at the emitter. Thus large signals are attenuated. Stated somewhat differently as the input pulses increase in negative amplitude at junction 13 and at the base of $Q_1$ (NPN), the gain of $Q_1$ decreases to less than unity.

The collector of $Q_1$ is connected directly to source 20 and the emitter is connected to ground through a .3 micro-henry choke and a 51 ohm resistor 15.

The advantage of the above-mentioned circuitry is that output pulses from the emitter of $Q_1$, as compared with their input, have been compressed in a non-linear manner because of the non-linear emitter-base diode characteristics. As the input signals at 13 increase in amplitude, the back-biasing increases at the emitter-base diode of $Q_1$, the gain of $Q_1$ decreases, the compression ratio of $Q_1$ increases and the output signal from the emitter of $Q_1$ decreases resulting in attenuation of the input signal to $Q_2$. The attenuation provided by $Q_1$ prevents overloading and pulse stretching in the amplifier for a wide range of input pulses in excess of 100 to 1 range.

The output of $Q_1$, as so attenuated, is differentiated by the 100 pico-farad condenser 14 and bias resistor 26 to provide sharp negative and positive pulses at the base of $Q_2$.

$Q_2$ is biased near saturation by the connection of its base to the series bias circuit including 4.7K ohm resistor 26, .3 micro-henry choke 27 and 6.8K ohm resistor 28. The voltage at the base of $Q_2$ is approximately plus 1.4 volts in contrast with one volt at the base of $Q_1$, and $Q_2$ is normally heavily conducting and near saturation. A positive input signal at the base of $Q_2$ can not cause any increase in current flow. Thus only the negative pulses which resulted from differentiation at 14 are amplified at $Q_2$ and coupled from the collector through condenser 24 to the base of $Q_3$. The emitter of $Q_2$ is connected to ground through resistor 25 and condenser 21 to prevent degeneration; the collector is connected to the source through resistor 23 and choke 22.

Pulse amplifier $Q_3$ is biased at cut off. The base of $Q_3$ is biased by connecting it to the series bias circuit including 1K ohm resistor 36, .3 micro-henry choke 37 and 8.2K ohm resistor 38.

Thus the base of $Q_3$ is at approximately only 0.7 volt. The emitter circuit includes resistor 35 and condenser 31 to prevent degeneration; the collector is connected to source 20 through choke 32 and resistor 33. The output from $Q_3$ is connected through condenser 34 and resistor 39 to the base of $Q_4$. The positive output pulse at the collector of $Q_2$ is differentiated at 24 and 36. Since $Q_3$ is normally cut off, only the positive differentiated pulse is effective. This positive pulse causes at the base of $Q_3$ is effective. This positive pulse causes increased current flow at the collector of $Q_3$ causing its collector to go negative. Condenser 34 which is normally charged to the source voltage, then discharges through resistors 39 and 46 to provide a negative pulse at the base of $Q_4$.

Pulse amplifier $Q_4$ is biased near saturation in the same manner as $Q_2$. The bias circuit includes 1K ohm resistor 46, choke 47 and 1.3K ohm resistor 48 and provides a large positive bias at the base of $Q_4$. Accordingly, only the negative pulses developed at 46 by the discharge of 34 are effective at $Q_4$. These negative pulses decrease current flow in the collector of $Q_4$, choke 42 and resistor 43. The resulting positive output pulse at the collector of $Q_4$ is coupled through condenser 44 and resistor 49 to tunnel diode 50.

A threshold bias source is formed by the connection of resistor 53, and potentiometer 54 in parallel with each other and in series with resistor 52 to source 20. The tap on potentiometer 54 is connected through resistor 55 and choke 51 to tunnel diode 50. The threshold bias is set at 54 for the quiescent operating point of the tunnel diode shown as $I_a$ in FIG. 2. The positive pulse at the collector of $Q_4$ is differentiated and results in firing of the tunnel diode to provide a sharp output pulse through resistor 56 and condenser 57 to output terminal 60.

Figure 2:
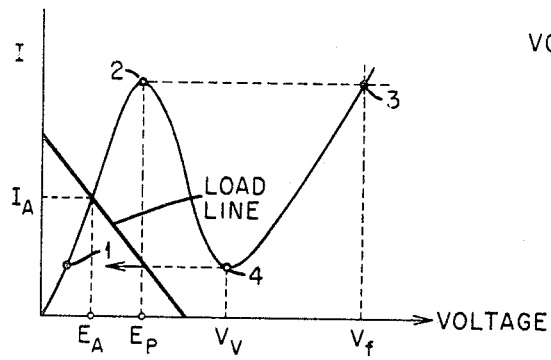
FIG. 2 is a graph showing the current-voltage characteristic of the tunnel diode operated in the monostable mode.
Figure 3:
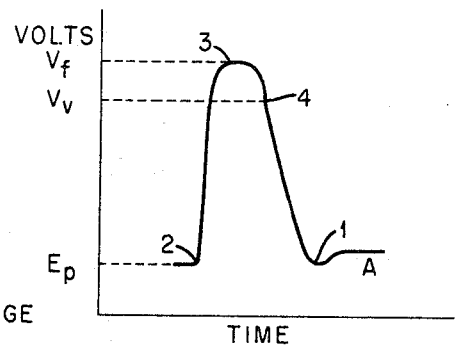
FIG. 3 is a graph of a typical output pulse from the tunnel diode.

The operation of the tunnel diode is described with reference to FIGS. 2 and 3. FIG. 2 shows the current-voltage curve of the tunnel diode while FIG. 3 shows the output pulse of the tunnel diode. Tunnel diode 50 is biased by potentiometer 54 to operate in a monostable mode; i.e., the diode is biased in its forward direction to have a quiescent operating point on the positive slope of the curve with a current $I_A$ low voltage high current position. The load line is adjusted to intersect only this one point and thus results in monostable operation.

The positive peak of the differentiated input pulse to the tunnel diode from transistor $Q_4$ will switch the tunnel diode from its quiescent operating point to the high voltage state at point 3 as shown in FIG. 2 to produce the leading edge of an output pulse as shown in FIG. 3.

The current in inductance 51 will then decrease exponentially from its value at point 3 until it reaches the valley current $I_V$ at which time the tunnel diode will switch back to the low voltage state so that the width of the pulse is determined by the time required for the diode to switch from point 3 to point 1.

The switching time from point 2 to point 3 in FIG. 2 is the rise time of the output pulse as shown in FIG. 3. The time interval between points 3 and 4 is the pulse duration and the time interval between points 4 and 1 is the fall time of the output pulse. The recovery time of the diode is the time interval between point 1 and the quiescent operating point A. The total pulse time is less than ten nanoseconds ($10 \times 10^{-9}$ seconds) so that this diode circuitry is capable of response to input pulses having a frequency in excess of 100 megacycles.

The pulse amplifier is a cascade of NPN transistor stages in which alternate transistors are biased near saturation and cut-off with differentiating circuits connecting the output of one transistor to the input of the succeeding stage. For example, $Q_2$ operates near the saturation region, $Q_3$ operates at cut-off, and $Q_4$ operates near the saturation region. One differentiating circuit includes condenser 24 and resistor 36 for coupling the output of $Q_2$ to the input of $Q_3$; similarly differentiating circuit 34, 39, and 46 couples the output of $Q_3$ to the input of $Q_4$.

The transistor cut-off region is defined as one in which the emitter and collector are back-biased so that there is essentially no collector-emitter circuit flow. The normal operating region of a transistor is called the active region in which the emitter is forward biased and the collector is reversed biased. The saturation region of a transistor is one in which both the emitter and collector junctions are forward biased to produce substantial current flow. The input impedance to a transistor operating near saturation region is very low in contrast with the input impedance to a transistor operating in the cut-off region which is high.

The advantages of the pulse amplifier as above described is that it provides maximum amplification per stage by utilizing the maximum swing of the transistor over the operating load line while also obtaining linearity and minimum distortion of the pulse shape as is more fully described below.

If one considers the curve of normal collector current versus collector voltage for various base currents where the input signal is applied to the base, the advantages of this disclosure in amplifying a wide amplitude range of input pulses will be evident. The load line for such a curve is drawn between a point on the abscissa (collector voltage) equal to the cut-off voltage and is drawn to a point on the ordinate (collector current) as is well known. Now, if one transistor is operated near the saturated region such as $Q_2$, $Q_2$ can amplify pulses having a wide amplitude range because it can amplify any pulse which causes a decrease in the base current from the saturation value at one end of the load line to the cut-off value at the other end of the load line. Similarly $Q_3$ which operates at cut-off can amplify any input pulse at its base which increases the base current to any value from cut-off value up to its saturation value. Consequently, all stages are capable of amplifying very small or very large signals and the stages alternate in the sense that one stage is working up the load line from cut-off to saturation while the next stage is working down the load line.

The pulse amplifier also has the advantage that it amplifies only the leading edge of input pulse 10 and disregards the remainder so that very narrow output pulses are produced. The leading edge of negative input pulse 10 is negative at the emitter of $Q_1$. The output from the emitter of $Q_1$ is differentiated at 14 and 26 to produce a negative pulse followed by a positive pulse at the base of $Q_2$. With $Q_2$ nearly saturated, only the negative pulses are amplified and the positive pulses are clipped.

The resulting output pulse from the collector of $Q_2$ is a positive pulses representing the leading edge of input pulse 10. $Q_3$ operates at cut-off with a collector to emitter voltage of 7.6 volts and essentially zero base current. The positive output pulse from $Q_2$ is differentiated at 24 and 36; initially capacitor 24 is charged to the positive peak at the collector of $Q_2$ and then discharges with a negative pulse. The positive pulse at the base of $Q_3$ causes an increase in current flow while the negative peak has no effect since $Q_3$ is normally cut-off.

The output of $Q_3$ at its collector is a negative pulse which is differentiated at 34, 39, and 46. Thus at the base of $Q_4$ there is a negative pulse followed by a positive pulse. Since $Q_4$ is near saturation, only the negative input pulse is amplified while the positive pulse is clipped.

The result of this circuit is that pulse 10 is successively differentiated and only those pulses corresponding to the leading edge of pulse 10 are amplified. An additional advantage of this pulse amplifier circuit is that it greatly improves the resolution time between adjacent input pulses. In the preferred circuit this resolution time is of the order of several nanoseconds.

Linearity of amplification of the leading edge of the pulses is also obtained in the pulse amplifier by this choice of alternate stages of transistors biased at cut-off and near saturation. Linearity is obtained by providing that the output pulse from each amplifier be a function of the charge or discharge time of one of the differentiating capacitors considering that the input impedance of $Q_2$ and $Q_4$ is low while the input impedance of $Q_3$ is large.

Thus, at the input of $Q_2$, the leading edge of the input pulse is developed by a discharge of capacitor 14 through resistor 26 and not through the low impedance emitter-base circuit of $Q_2$. In contrast with this situation, the leading edge of the pulse is developed at the input of $Q_3$ by the charging of capacitor 24 through the emitter base of $Q_3$ which is a relatively high impedance because of its normal cut-off condition. Similarly the leading edge of the pulse at the input of $Q_4$ is developed by the discharge of capacitor 34 through resistors 39 and 46. Thus the leading edge of the pulses is developed in both the near saturated and cut-off stages in long time constant circuits which provide linearity because of the linearity of R-C time constant circuits in these regions, while the portion of the pulse which is not developed and not desired trailing edge is eliminated during the short time constant periods of the various condensers and resistors.

One of the problems of the circuit as so far described in the inherent capacitive reactance of transistors at high frequencies of the order of 100 megacycles. This reactance varies with frequency and may result in network instability or oscillation. In addition such interelectrode capacitive reactance causes a change in the input and output impedance of the transistors and thus destroys the linearity of pulse shaping and amplification provided by the differentiating circuits. Accordingly, in the circuit of this invention .3 micro-henry inductors are used in the base and collector circuits. These inductors serve to neutralize the transistor input and output capacitance and assure an adequate impedance at the operating frequency. With an increase in frequency the interelectrode capacitive reactance between base and emitter increases to shunt the input circuit; this effect is neutralized by inductor 27 in the base of $Q_2$ for example or 37 in the base of $Q_3$. Thus, the input impedance to these transistors remains resistive. Similarly the inductors 22, 32, and 42 in the collectors of $Q_2$, $Q_3$ and $Q_4$ neutralize the collector to emitter interelectrode capacitance.

Network stability with transistor circuitry is very difficult at high frequency. Self-sustained oscillation in such circuits may occur for several reasons. Regenerative feedback may occur as a result of coupling between the passive circuit elements. Additional feedback may occur due to inadequate filtering of the power supply and ground loop feedback because of inadequate grounding. In addition there is internal feedback within the transistor because of the interelectrode capacitance and because transistors conduct bilaterally.

Figure 4:
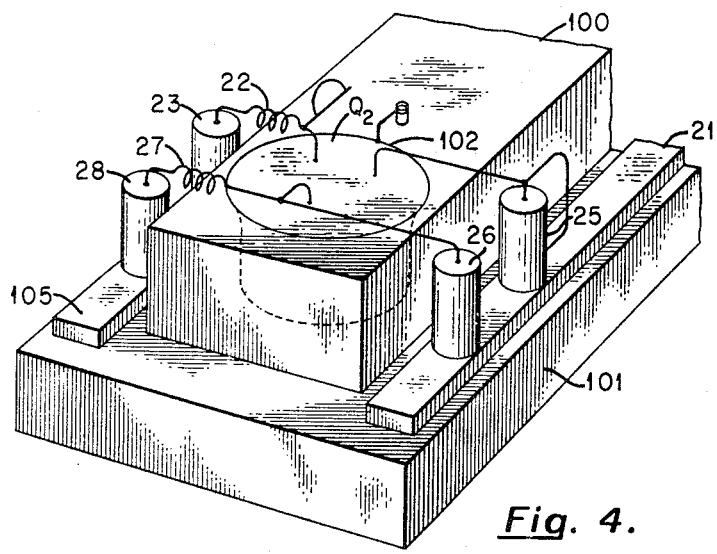
FIG. 4 is a perspective view of a portion of the circuit mounted on a conducting bar and printed circuit.
Figure 5:
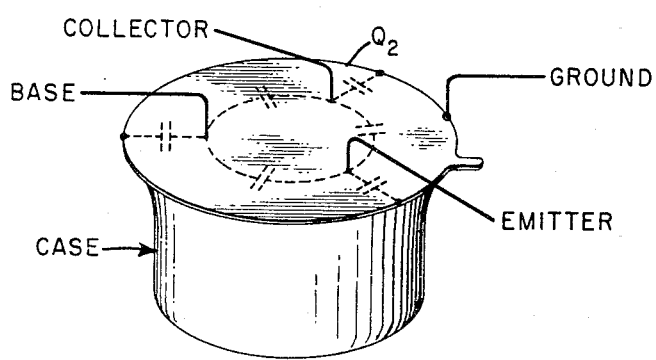
FIG. 5 is a perspective view of a single transistor case showing the distributed capacity between electrodes and the case.

FIG. 4 shows a preferred method of overcoming the effects which cause such regeneration. A brass strip of metal 100 is mounted on a copper clad printed circuit board 101, the brass strip is shown in dotted lines in FIG. 1. The brass strip contains a number of holes, one for each of the transistors; one such hole is shown as 102. Transistors normally include an emitter base and collector electrode which are mounted within a conducting case as shown in FIG. 5.

The transistors are mounted in successive holes along the line 100; for example $Q_2$ is mounted in hole 102 as shown. The emitter resistor 25 and bias resistor 26 are positioned on one side of the strip 100 while the collector resistor 22 and bias resistor 28 are positioned on the other side of the strip 100. The collector and base choke coils 27 and 22 are positioned on the top of strip 100 adjacent and parallel each other. Similarly $Q_1$, $Q_3$ and $Q_4$ and their associated circuit components are mounted on strip 100 in the same manner in a line sequence.

The printed circuit includes a voltage supply line 105 and a ground lead. The strip 100 and resistors 25 and 26 are connected to the ground lead. The cover or can of the transistor is connected to the grounded strip line.

The significance of the strip line circuitry of FIG. 4 is that the input circuit components are on one side of the strip, the output circuit components are on the other side of the strip, the transistor can is grounded, the coils are on the top of the strip and the connection from the output of one transistor is connected to the input of the succeeding transistor by a wire running along the top of the strip. Thus the conducting strip 100 shields the input circuit from the output circuit and vice versa. In addition the strip acts as a large ground plane for circuit components mounted adjacent thereto so that the input and output circuit admittance of passive network may be considered as lumped circuit values which do not vary appreciably with large frequency variations.

While I have described a preferred embodiment of my invention as required, it will be obvious that modifications may be made therein. Accordingly, the scope of my invention is defined in the following claims.

I claim:

1. A high frequency pulse amplifier-discriminator for providing linear amplification of input pulses having a desired wide range of amplitude variation comprising an input circuit for receiving said high frequency pulses, an emitter-follower transistor circuit biased at unity gain and having an output and an input connected to said input circuit, said input circuit including a diode limiter for limiting pulses having an amplitude greater than the amplitude of said desired pulses, a pulse amplifier, a tunnel diode discriminator, said pulse amplifier having an input for receiving the output of the emitter-follower and an output for connection to said tunnel diode, said pulse amplifier including a cascade connection of transistor amplifiers having alternate amplifiers biased near saturation and cut-off and differentiating circuits connecting adjacent transistors between the output of one to the input of the succeeding one, the order of said alternate stages being such that the pulse arriving at the input of such transistor which corresponds with the leading edge of received pulses at the input circuit has a polarity for increasing conduction in the cut-off transistor and decreasing conduction in the near saturated transistor, means for biasing the tunnel diode in its forward direction at a desired threshold level for monostable operation, and for firing said tunnel diode upon receipt of a pulse from said pulse amplifier.

2. The improvement as in claim 1 further including an electrically conducting bar having spaced holes in one surface thereof, means for mounting individual ones of said transistors in individual ones of said holes, means for grounding said bar and for connecting the transistor containers to said bar, means for positioning the input and output circuit elements of said transistors adjacent opposite surfaces of said bar.

3. A high frequency pulse amplifier including a source of power, an input terminal for receiving pulses of one polarity, a diode clipper connected across said input terminal, an emitter-follower having its base connected to said input terminal and its emitter-collector circuits connected across said power supply, means for biasing said emitter follower for providing a large emitter-base current at unity gain such that signals of said one polarity decrease the emitter-base current, a pulse amplifier including cascaded stages having alternate stages biased near saturation and cut-off, differentiating means connecting the output of the emitter-follower to the input of the a amplifier, differentiating means connected between the stages of said pulse amplifier, a tunnel diode, means for biasing said tunnel diode at a predetermined threshold value in high current low voltage normally conducting state, means for connecting the output of said pulse amplifier to said tunnel diode for switching the diode to a high current high voltage state whereby very narrow pulses are provided in response to input pulses which exceed a predetermined value.

References Cited
UNITED STATES PATENTS

| | | | |
|---|---|---|---|
| 3,235,747 | 2/1966 | Pingry | 307—237 |
| 3,237,019 | 2/1966 | Fitzgerald | 307—237 |
| 3,254,230 | 5/1966 | Wahrer | 307—237 |

JOHN S. HEYMAN, *Primary Examiner.*